United States Patent [19]
Shiota et al.

[11] Patent Number: 5,334,434
[45] Date of Patent: Aug. 2, 1994

[54] VIBRATION OR SHOCK ABSORBING MEMBER

[75] Inventors: Tomio Shiota, Takatsuki; Toshiharu Hikida, Kyoto; Masashi Sugimoto, Suita; Kazuhiko Kodama, Kyoto; Kaoru Shimizu, Osaka, all of Japan

[73] Assignee: Matsushita Electric Industrial Co., Ltd., Osaka, Japan

[21] Appl. No.: 832,961

[22] Filed: Feb. 10, 1992

[30] Foreign Application Priority Data

Feb. 15, 1991 [JP] Japan ................... 3-021925

[51] Int. Cl.⁵ .................................................. B32B 3/20
[52] U.S. Cl. .................................... 428/188; 428/167; 428/178; 248/632; 248/634
[58] Field of Search ............... 428/188, 178, 120, 167, 428/304.4, 313.3; 248/632, 634

[56] References Cited

U.S. PATENT DOCUMENTS

| | | | |
|---|---|---|---|
| 2,998,214 | 8/1961 | Peterman | 428/178 |
| 3,941,157 | 3/1976 | Barnett | 138/115 |
| 4,136,412 | 1/1979 | Wilhelm | 428/178 |
| 4,435,463 | 3/1984 | Roellchen | 428/188 |
| 4,478,889 | 10/1984 | Mayumi et al. | 428/178 |
| 5,023,128 | 6/1991 | Fatoul | 428/188 |

FOREIGN PATENT DOCUMENTS

| | | |
|---|---|---|
| 60-24948 | 7/1985 | Japan . |
| 61-169076 | 10/1986 | Japan . |
| 62-75926 | 5/1987 | Japan . |
| 62-159703 | 10/1987 | Japan . |
| 64-32222 | 2/1989 | Japan . |
| 1204871 | 8/1989 | Japan . |
| 323925 | 1/1991 | Japan . |
| 336027 | 2/1991 | Japan . |
| 2122136 | 5/1983 | United Kingdom . |
| 2235150 | 7/1989 | United Kingdom . |
| 9202964.4 | 6/1992 | United Kingdom . |

*Primary Examiner*—Donald J. Loney
*Attorney, Agent, or Firm*—Ratner & Prestia

[57] ABSTRACT

A vibration or shock absorbing member which is composed of a material capable of effecting injection molding such as plastics, rubber, ceramics, metallic powder mixed and kneaded with a specified binder, or glass powder mixed and kneaded with a specified binder, and includes an integral structure, a plurality of protrusions formed at least on one main flat surface of the integral structure, and a plurality of independent hollow portions provided symmetrically or in an aligned state within the integral structure through intersecting partition walls. Such integral structure is molded as one unit by one-shot molding (molding at one time) or by a single molding die for expanding the range of selection for materials and spring constants so as to achieve freedom in the choice of shapes and reduction in weight.

18 Claims, 8 Drawing Sheets

To be slid after completion of primary molding

Die closed state in preparation for secondary molding

Coupled state of respective halves of hollow structure in preparation for secondary molding

VIBRATION OR SHOCK ABSORBING MEMBER

BACKGROUND OF THE INVENTION

The present invention generally relates to a vibration on shock-absorbing member, and more particularly, to a vibration proof or buffer member (referred to as a vibration or shock absorbing member hereinafter) provided with hollow portions formed therein.

Conventionally, the vibration or shock absorbing member for alleviating and absorbing vibrations or impacts as referred to above is, for example, so arranged that, as shown in FIGS. 9 and 10, a plurality of cylindrical protrusions 22 are aligned at predetermined intervals on opposite main surfaces of a flat plate made of rubber material or the like, thereby to constitute said member 21 as illustrated.

Furthermore, there have also been conventionally proposed, for example, in Japanese Patent Laid-Open Publications Tokkaisho No. 60-24948 and Tokkaihei No. 3-36027, vibration or shock absorbing members each including a plurality of independent protrusions provided on one side face of a base material, and hollow portions formed to correspond to said protrusions.

In the known constructions as described above, however, there are such problems as restriction to selection of materials, difficulty in setting spring constants for the elastic function as desired due to limited range of selection of rubber hardness, difficulty for withstanding large loads, inferior resistance to heat, and difficulty in reducing weight in the case of a shape without any hollow portions.

SUMMARY OF THE INVENTION

Accordingly, an essential object of the present invention is to provide a vibration or shock absorbing member in which ranges for selecting materials and spring constants are expanded so as to achieve reduction in weight, with substantial elimination of disadvantages inherent in the conventional members of this kind.

Another object of the present invention is to provide a vibration or shock absorbing men, bet of the above described type in which a plurality of independent hollow portions are provided, thereby to improve rigidity and heat insulating characteristic, without increasing the amount of used plastics material to a large extent.

In accomplishing these and other object, according to one preferred embodiment of the present invention, through application of a hollow injection molding technique, there is provided a vibration or shock absorbing member which includes an integral structure, a plurality of protrusions formed at least on one main flat surface of said integral structure, partition walls intersecting each other in an X-shape or +-shape within the integral structure, and a plurality of independent hollow portions formed by said partition walls within the integral structure. The above integral structure is formed into one piece by a one-shot molding (molding at one time, in which e.g. the injection molding process and blow molding process are simultaneously employed), or by a single injection molding die through post-forming (e.g. firstly by a divided molding, with subsequent formation into one piece) by causing a stationary side and a movable side of said injection molding die to slide against each other.

By the above arrangement according to the present invention, the selecting range of the materials and the spring constants may be enlarged, thereby to make it possible to employ a variety of materials such as various plastics besides the rubber material, while the shapes of the member may be set as desired to achieve reduction in weight.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
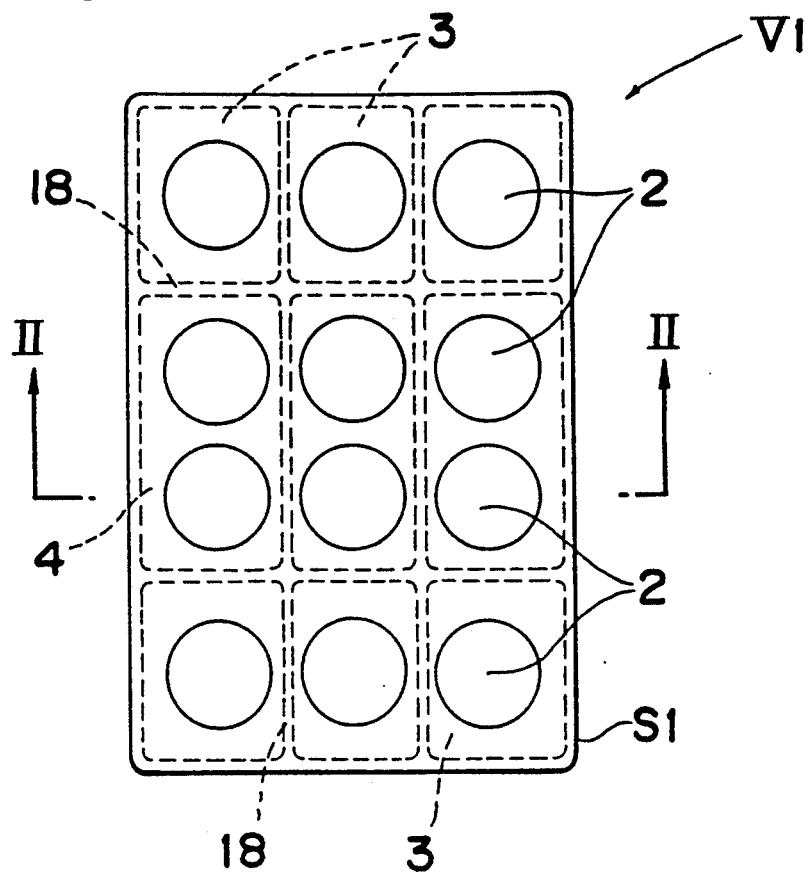
FIG. 1 is a top plan view of a vibration or shock-absorbing member according to a first embodiment of the present invention.

Before the description of the present invention proceeds, it is to be noted that like parts are designated by like reference numerals throughout the accompanying drawings.

In the first place, it is to be noted that the vibration or shock absorbing member according to the present invention includes an integral structure in which a plurality of respectively independent hollow portions are formed as defined by partition walls intersecting each other in an X-shape, +-shape or T-shape, and such integral structure is molded in a manner as described hereinbelow.

(1) Formation by one-shot molding (one-time molding). By way of example, a set of hollow injection molding dies in which one die is slidably fitted into the other die is prepared and a hollow molded item is formed by enlarging the cavity of the one set of dies, while the plurality of partition plates are releasably incorporated into the die at the sliding side so as to form the partition walls intersecting in the X-shape, T-shape or +-shape or the like.

(2) For example, through employment of one molding die, respective half portions are injection-molded by a primary molding, and subsequently, by causing the injection molding die which forms the respective half portions to slide against each other between the stationary side and movable side for a secondary molding, said respective half portions are coupled to each other by the secondary molding plastics material for the integral molding.

More specifically, as shown in FIGS. 11 to 15, the integral structure plate 300 includes two hollow structure plate halves or half portions 301 and 302 formed by the primary molding and combined with each other by a secondary molding plastics material (not shown), with independent hollow portions 303 and 304 being formed inside in the aligned state.

The half portions 301 and 302 are provided with grooves 307 formed in the partition walls 305 of the half portion 301 and corresponding portions in the mating half portions 302, and also, with stepped recesses 306 on a peripheral end face of the half portion 301, and a corresponding portion in the half portion 302 as illustrated. Procedures for the primary molding and secondary molding are as described above. It is to be noted that the above two injection molding is constituted by simultaneous use of the injection molding method and the blow molding method for blowing the nitrogen gas and the like, or single use of the injection molding method.

Referring particularly to FIGS. 1 to 8 showing embodiments according to the present invention, the vibration or shock-absorbing member is formed by a one-shot molding or by a single molding die, into an integral structure in which independent hollow portions are incorporated as defined by intersecting partition walls, and requires no particular junction or assembling of parts to each other.

Figure 2:
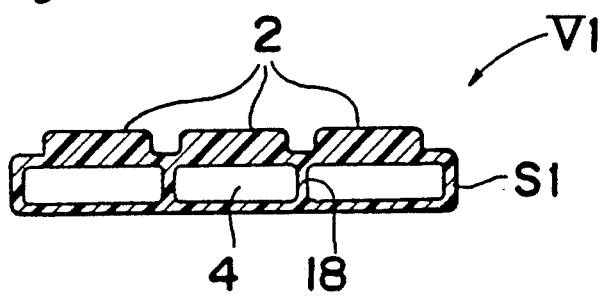
FIG. 2 is a cross section taken along the line II—II in FIG. 1.

In FIGS. 1 and 2, there is shown a vibration or shock-absorbing member V1 according to a first embodiment of the present invention which includes an integral structure S1 in a rectangular flat plate-like shape, a plurality of cylindrical protrusions 2 formed to be aligned on one main flat surface of the integral structure S1 at predetermined intervals, two kinds of hollow portions 3 and 4 different in size and symmetrically arranged within the integral structure S1 through intersecting partition walls 18, thereby to differentiate elastic functions of the protrusions 2 between the central portion and edge portion of said integral structure S1. More specifically, in the portions located below the under surface of said protrusions 3 and adjacent to the edges of the integral structure S1, the hollow portions 3 and 4 of a small volume each corresponding to one of the protrusions 2 are symmetrically provided at six portions, while hollow portions 4 having a large volume, and each corresponding to two of the protrusions 2 are provided at the central portion of the integral structure S1 as shown.

In the above first embodiment, it is so arranged that the spring constant of the protrusions 2 at the central portion is smaller than that of the protrusions 2 provided at the edge portions when said protrusions 2 are depressed in a direction of thickness of said vibration or shock-absorbing member. In other words, the distances from fixed support portions to the centers of the respective protrusions are adapted to be varied.

Naturally, the vibration or shock-absorbing member V1 as described so far is arranged to place an apparatus or device (not particularly shown) on the side provided with the protrusions 2 and serving as the contact surface for supporting impact applying items so as to alleviate the vibration and/or shock thereby.

Figure 3:
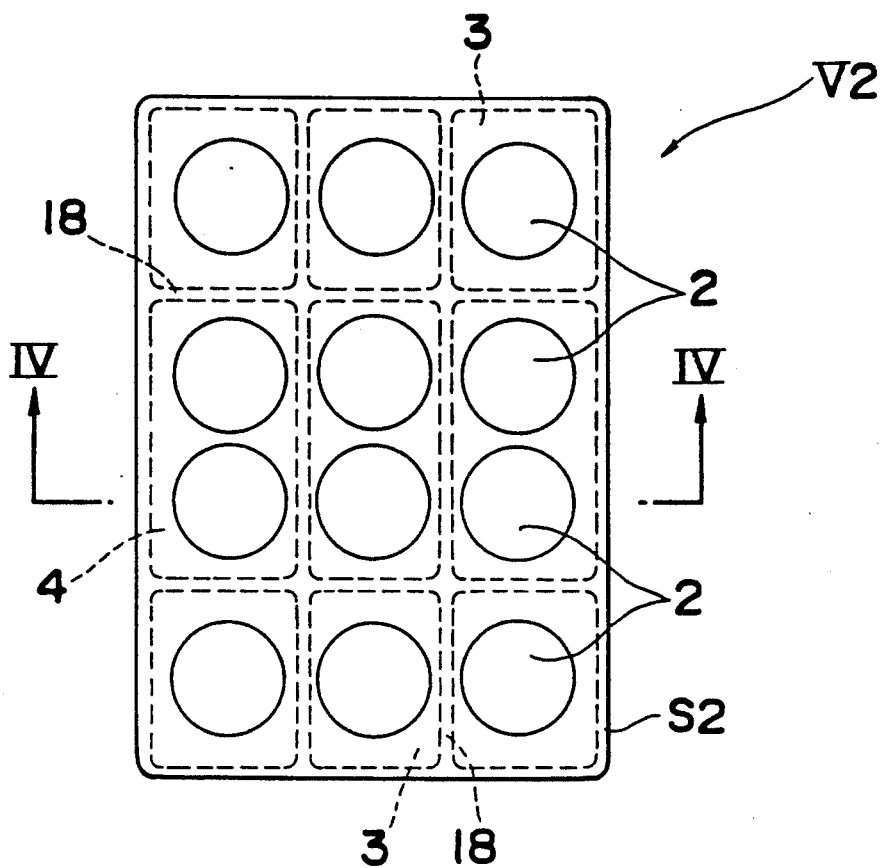
FIG. 3 is a top plan view of a vibration or shock-absorbing member according to a second embodiment of the present invention.
Figure 4:
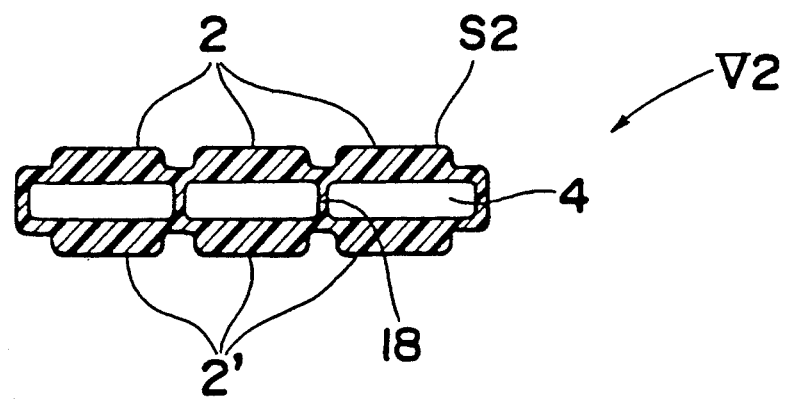
FIG. 4 is a cross section taken along the line IV—IV in FIG. 3.

In a vibration or shock-absorbing member V2 according to a second embodiment of the present invention as shown in FIGS. 3 and 4, the integral structure S2 has similar cylindrical protrusions 2' in corresponding positions on the other main surface in addition to the cylindrical protrusions 2 on the one main surface as described with reference to the integral structure S1 for the first embodiment of FIGS. 1 and 2, although other constructions are the same as those of the vibration or shock absorbing member V1 in FIGS. 1 and 2, with like parts being designated by like reference numerals.

In the basic function, the vibration or shockabsorbing member V2 is adapted to alleviate vibrations and/or impacts by the opposite main surfaces thereof in the similar manner as in the vibration or shock-absorbing member V1 described with reference to FIGS. 1 and 2.

Figure 5:
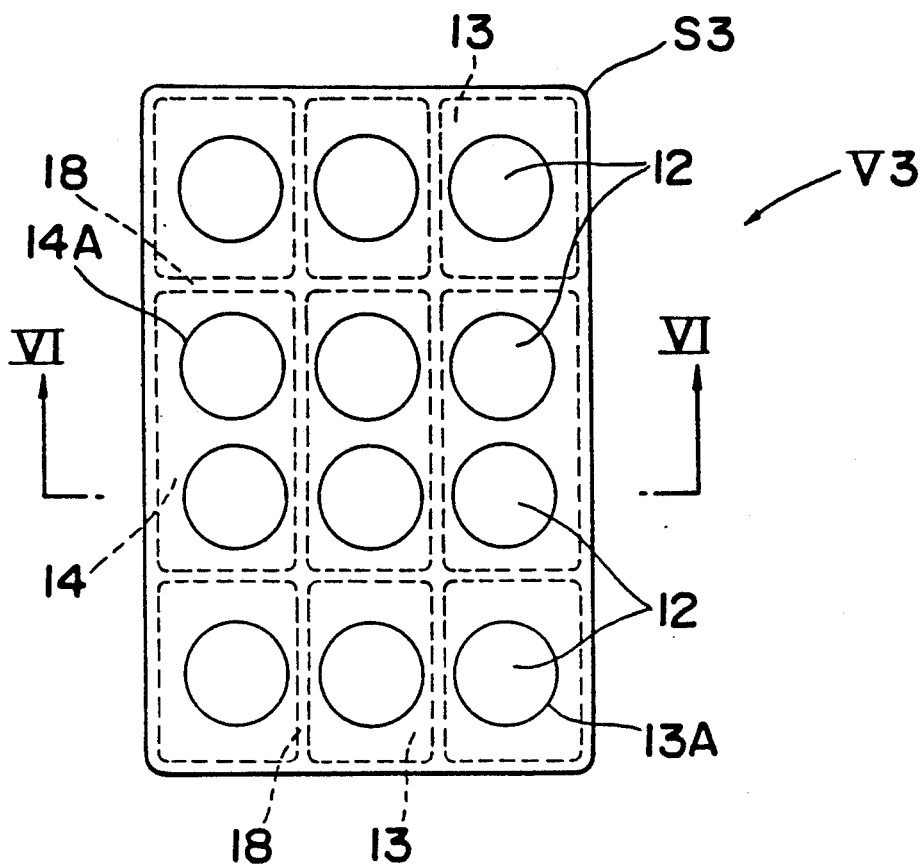
FIG. 5 is a top plan view of a vibration or shock-absorbing member according to a third embodiment of the present invention.
Figure 6:
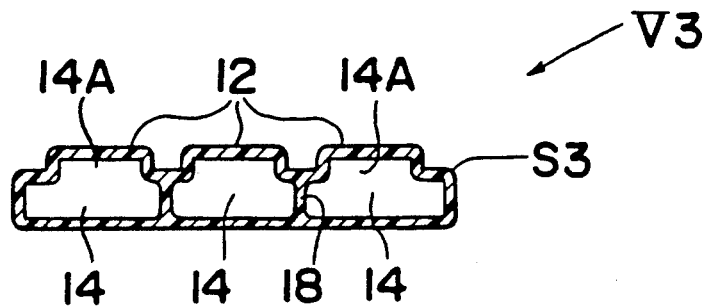
FIG. 6 is a cross section taken along the line VI—VI in FIG. 5.

Referring further to FIGS. 5 and 6, there is shown a vibration or shock-absorbing member V3 according to a third embodiment of the present invention. In short, in the vibration or shock-absorbing member V3, the shape of the hollow portions formed within the integral structure S1 for the vibration or shock-absorbing member V1 of the first embodiment is modified as described hereinbelow.

The vibration or shock absorbing member V3 includes an integral structure 33 in which a plurality of thin walled cylindrical protrusions 12 are formed in one main surface thereof, with hollow portions 13A and 14A independently provided to correspond to said thin walled protrusions 12 within the integral structure 33. Such integral structure S3 is also formed by a one-shot molding or by a one-piece molding with a single molding die. More specifically, in one main surface of the integral structure S3, the plurality of independent thin walled protrusions 12 and first hollow portions 13A and 14A corresponding to the shape of said thin walled protrusions 12 are provided, while a plurality of independent second hollow portions 13 and 14 commonly communicated with the plurality of said first hollow portions 13A and 14A are formed by the intersecting partition walls 18 within said integral structure S3.

In the vibration or shock-absorbing member V3 as described above, although the external appearance of the thin walled protrusions 12 is similar to that of the protrusions 2 in the first embodiment of FIGS. 1 and 2, deformation thereof upon reception of vibration and/or impact is facilitated by reducing the wall thickness for the protrusions 12, with further improvement on the vibration proof or buffer effect for expansion of degree of freedom in design. Needless to say, with respect to the materials, the range of selection is expanded, and it is possible to employ, besides rubber materials, various plastics and ceramics, or materials capable of effecting injection molding such as metallic powder or glass powder, etc. mixed and kneaded with a predetermined binder may be utilized.

In the case where the vibration-or shock-absorbing member V3 is constituted by ceramics, it may be so arranged to alleviate the impacts by crushing upon reception of the impacts on the surfaces of the protrusions.

Figure 7:
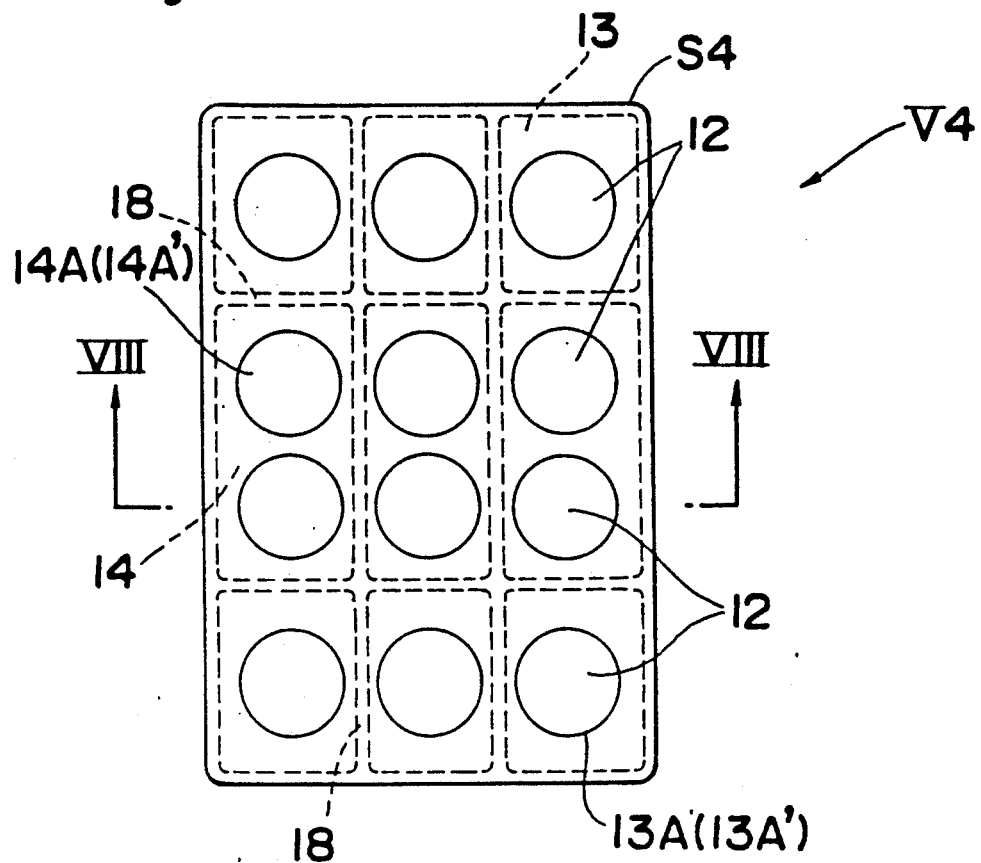
FIG. 7 is a top plan view of a vibration or shock-absorbing member according to a fourth embodiment of the present invention.
Figure 8:
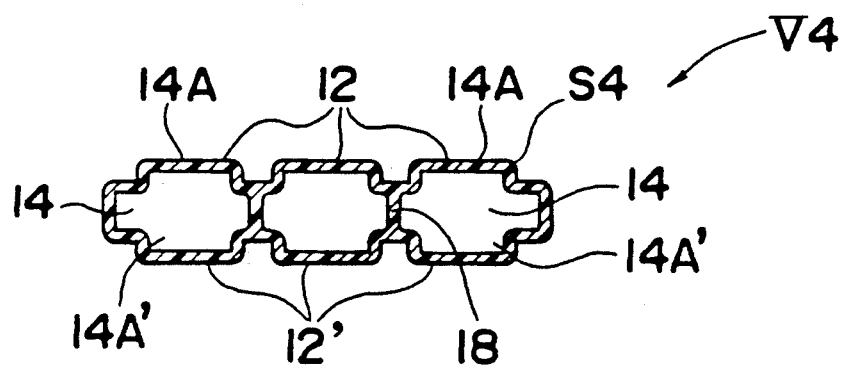
FIG. 8 is a cross section taken along the line VIII—VIII in FIG. 7.
Figure 9:
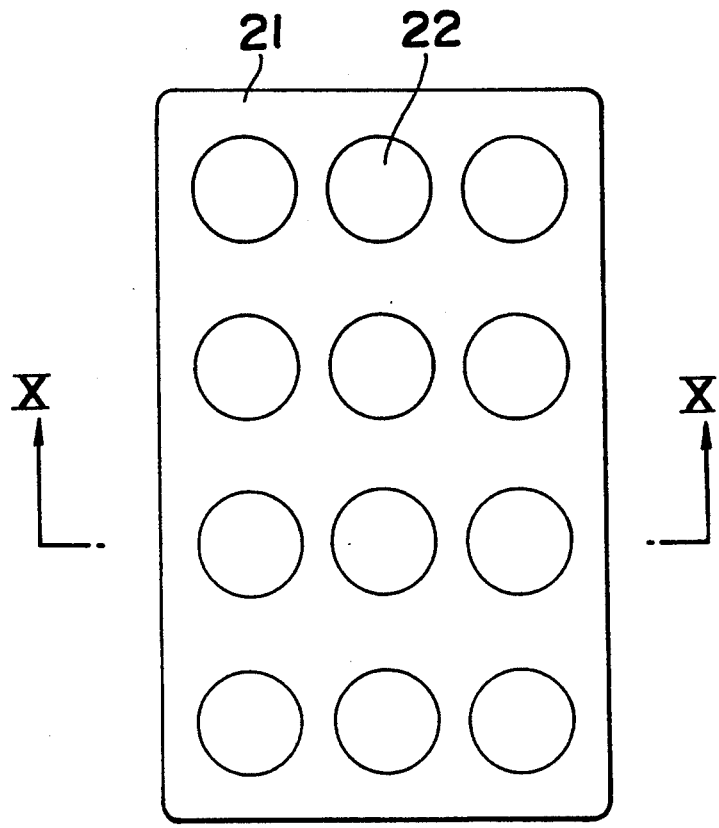
FIG. 9 is a top plan view of a conventional vibration or shock-absorbing member (already referred to)
Figure 10:
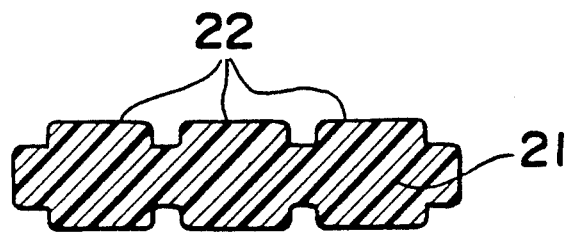
FIG. 10 is cross section taken along the line X—X in FIG. 9 (already referred to)
Figure 11:
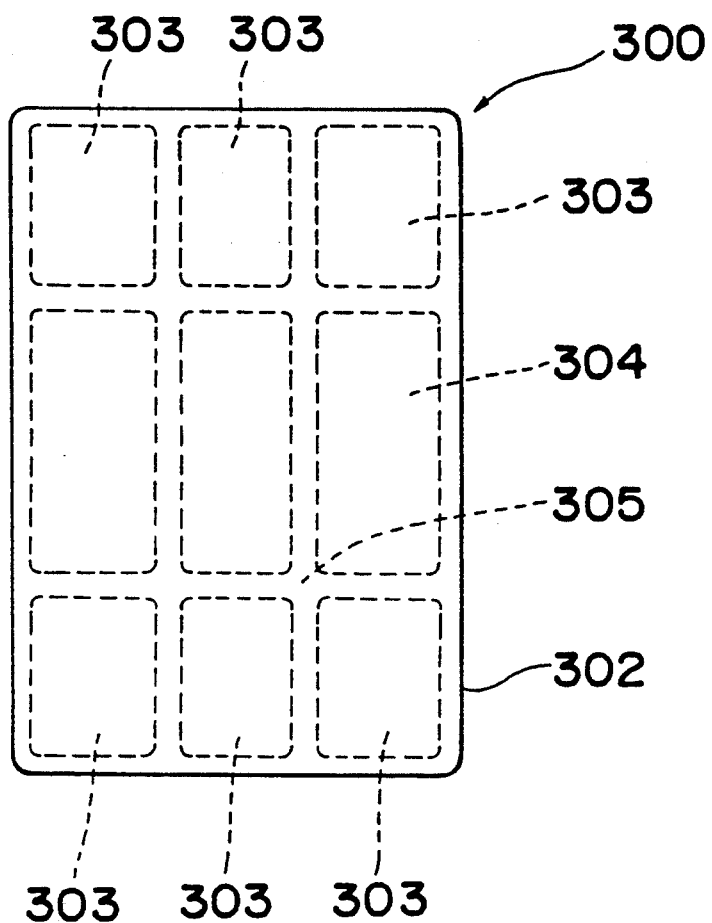
FIG. 11 is top plan view of a hollow structure plate for explaining molding process in the embodiment of the present invention.
Figure 12:
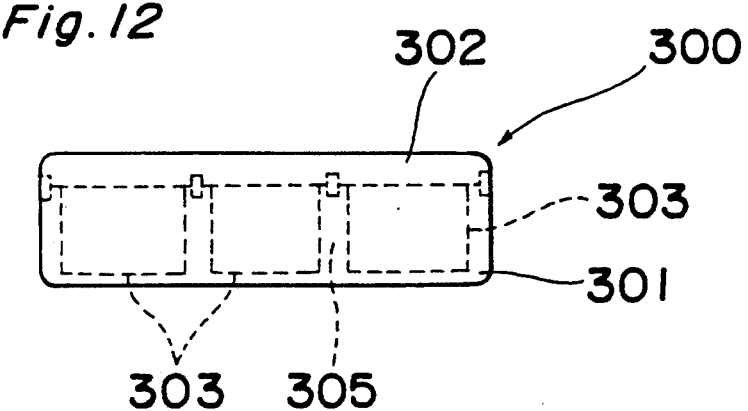
FIG. 12 is a front elevational view of the hollow structure plate in FIG. 11, FIGS. 13(A) to 13(C) are side sectional diagrams of the hollow structure plate for explaining procedures of molding process in the embodiment of the present invention.
Figure 13A:
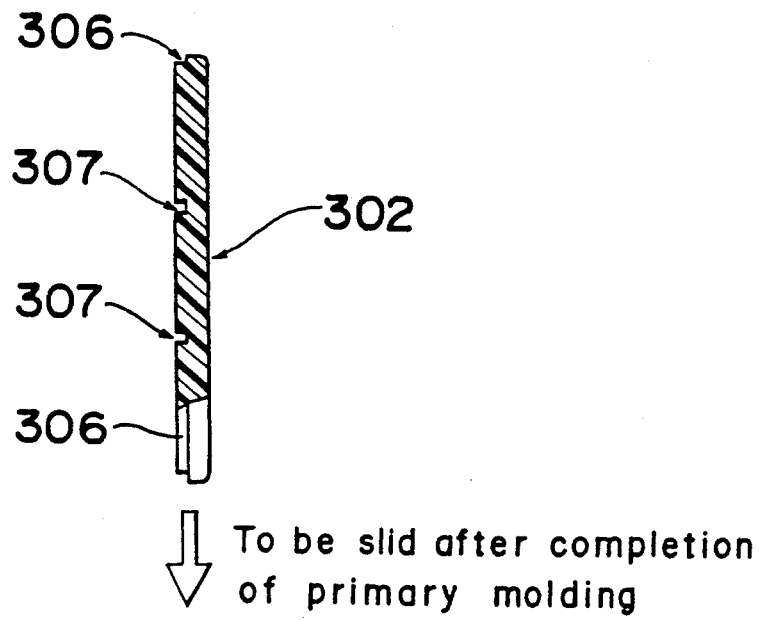
Figure 13B:
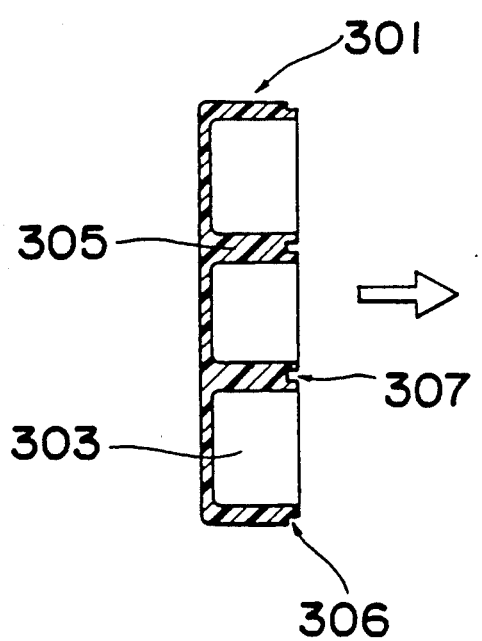
Figure 13C:
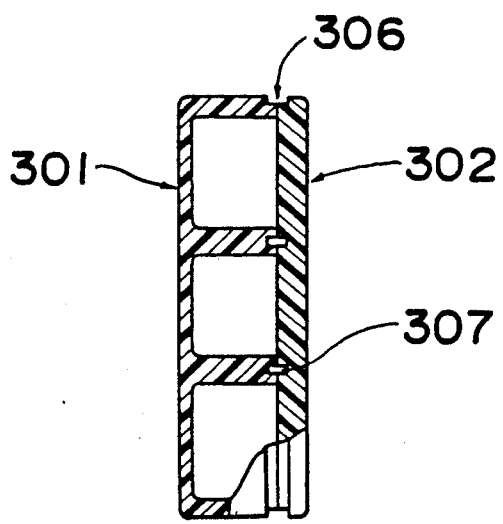
Figure 14:
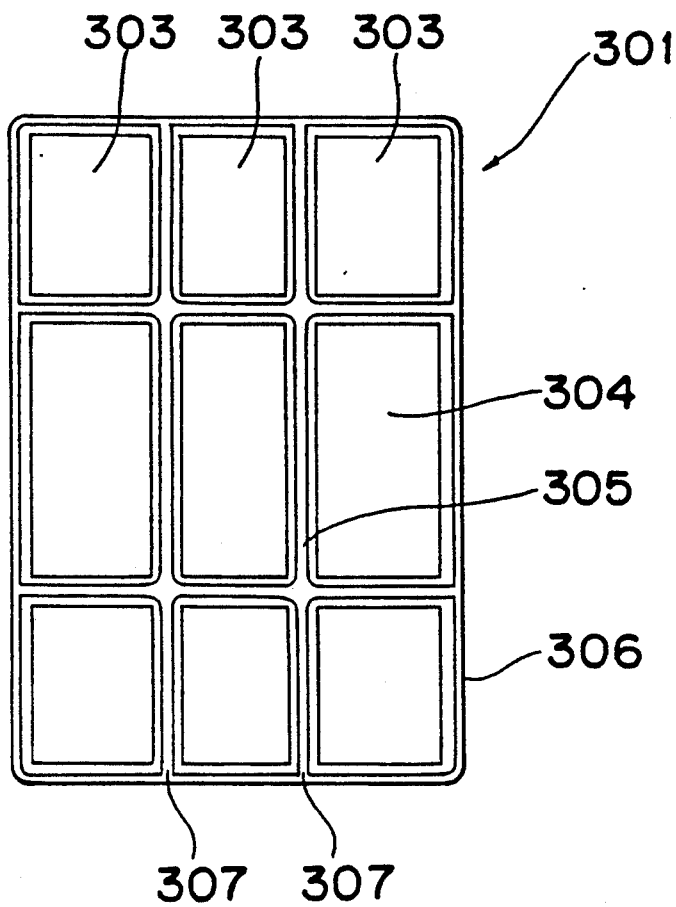
FIG. 14 is a top plan view of the hollow structure plate of FIG. 11, with an upper half thereof removed for clarity.
Figure 15:
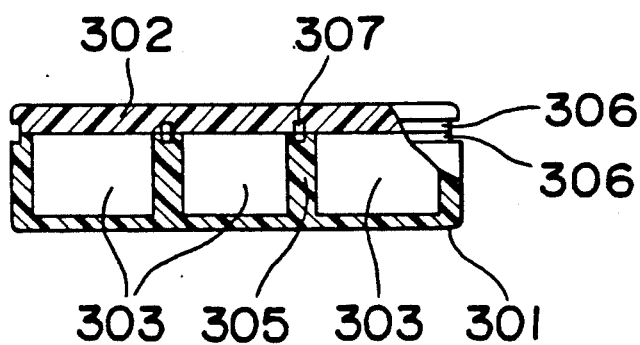
FIG. 15 is a cross section of the hollow structure plate of FIG. 14 as viewed from the front side, with its upper half applied thereon.

In a vibration or shock-absorbing member V4 according to a fourth embodiment of the present invention as shown in FIGS. 7 and 8, the integral structure S3 for the third embodiment is modified into an integral structure S4 having thin walled protrusions 12' at corresponding positions also on the other main surface thereof as shown, although other construction are generally similar to those of the integral structure S3, with like parts being designated by like reference numerals. The basic function of the vibration or shock-absorbing member V4 is generally similar to that of the member V3 of the third embodiment, and intended to alleviate vibration and/or impact on the opposite faces thereof in the similar manner as in the third embodiment.

In the foregoing embodiments, the total volume occupied by the hollow portions 3 and 4 or 13 and 14 is set to be 20 to 90% of the volume as occupied by the external shape of the vibration or shock-absorbing member. Such total volume as occupied by the hollow portions may be determined according to the purpose for use, spring constant, or necessary strength, and also to the member constituting the vibration or shock absorbing member.

As described so far, in the vibration or shock absorbing member according to the present invention, by providing the plurality of protrusions or thin walled protrusions at least on one of the main flat surfaces, with the plurality of hollow portions formed within the member as predetermined, absorbing and alleviating performance for vibrations and impacts is improved, thus expanding the degree of freedom in designing.

Furthermore, owing to the provision of the hollow portions, weight of the member may be reduced to a large extent for decrease of the used material, with consequent reduction in cost.

It is to be noted here that, in the foregoing embodiments, although cylindrical protrusions are shown as one example of configurations of the protrusions, the shape of the protrusions is not limited to such cylindrical form alone, but other configurations such as trapezoidal columns or square columns, etc. may also be employed so long as they serve the purpose of the present invention. Moreover, the surfaces of the protrusions need not necessarily be flat, but may be arcuate or concave shapes. It is needless to say that the external shape of the vibration or shock absorbing member is not required to be flat, but it may constitute any desired three-dimensional shape.

As is clear from the foregoing description, according to the vibration or shock absorbing member of the present invention, it is made possible to expand the range for selection of the materials and spring constants, and to employ a variety of materials such as various plastics besides the rubber material, while the shape of the member may be set as desired to achieve light weight and cost reduction.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A vibration or shock absorbing member which comprises an integral structure, a plurality of protrusions formed at least on one main flat surface of said integral structure in a matrix pattern, partition walls intersecting each other in the integral structure, and a plurality of independent hollow portions formed under said protrusions within the integral structure through said intersections partition walls in the matrix pattern, said integral structure being formed into one piece by a one-shot molding.

2. A vibration of shock absorbing member as claimed in claim 1, wherein said member is composed of a material capable of effecting injection molding, said material selected from the group consisting of plastics, rubber and ceramics.

3. A vibration or shock absorbing member according to claim 1, wherein each of said intersecting partition walls are substantially orthogonal to said one main flat surface.

4. A vibration or shock absorbing member which comprises an integral structure, a plurality of thin walled protrusion and a plurality of first hollow portions corresponding in shape to said thin walled protrusions formed at least on one main flat surface of said integral structure in a matrix pattern, partition walls intersecting each other in the integral structure, and a plurality of independent second hollow portions, each of said second hollow portions formed within said integral structure through said intersection partition walls independently in the matrix pattern so as to be commonly communicated with the plurality of said first hollow portions, said integral structure being formed into one piece by a one-shot molding.

5. A vibration or shock absorbing member as claimed in claim 4, wherein said member is composed of a material capable of effecting injection molding, said material selected from the group consisting of plastics, rubber and ceramics.

6. A vibration or shock absorbing member according to claim 4, wherein each of said intersecting partition walls are substantially orthogonal to said one main flat surface.

7. A vibration or shock absorbing member which comprises an integral structure, a plurality of protrusion formed at least on one main flat surface of said integral structure in a matrix pattern, partition walls intersecting each other in the integral structure, and a plurality of independent hollow portions, each of said hollow portions formed within the integral structure through said intersecting partition walls in the matrix pattern, said integral structure being formed into one piece with a single injection mold and also by sliding said one injection mold for secondary molding.

8. A vibration or shock absorbing member as claimed in claim 7, wherein said member is composed of a material capable of effecting injection molding, said material selected from the group consisting of plastics, rubber and ceramics.

9. A vibration or shock absorbing member according to claim 7, wherein each of said intersecting partition walls are substantially orthogonal to said one main flat surface.

10. A vibration or shock absorbing member which comprises an integral structure, a plurality of thin walled protrusions and formed a plurality of first hollow portions corresponding in shape to said thin walled protrusions formed at least on one main flat surface of said integral structure in a matrix pattern, partition walls intersecting each other in the integral structure, and a plurality of independent second hollow portions, each of said second hollow portions. each of said second hollow portions formed within said integral structure through said intersecting partition walls independently in the matrix pattern so as to be commonly communicated with the plurality of said first hollow portions, said integral structure being formed into one piece by one injection mold and also by sliding said one injection mold for secondary molding.

11. A vibration or shock absorbing member as claimed in claim 7, wherein said member is composed of a material capable of effecting injection molding, said material selected from the group consisting of plastics, rubber and ceramics.

12. A vibration or shock absorbing member according to claim 10, wherein each of said intersecting partition walls are substantially orthogonal to said one main flat surface.

13. A vibration or shock absorbing member which comprises an integral structure, a plurality of protrusions formed at least on one main flat surface of said integral structure in a matrix pattern, partition walls intersecting each other in the integral structure, and a plurality of independent hollow portions formed under said protrusions within the integral structure through said intersecting partition walls in the matrix pattern.

14. A vibration or shock absorbing member according to claim 13, wherein each of said intersecting partition walls are substantially orthogonal to said one main flat surface.

15. A vibration or shock absorbing member which comprises an integral structure, a plurality of thin walled protrusions and a plurality of first hollow portions corresponding in shape to said thin walled protrusions formed at least on one main flat surface of said integral structure in a matrix pattern, partition walls intersecting each other in the integral structure, and a plurality of independent second hollow portions formed under said walled protrusions within said integral structure through said intersecting partition walls independently in the matrix pattern so as to be commonly communicated with the plurality of said first hollow portions.

16. A vibration or shock absorbing member according to claim 15, wherein each of said intersecting partition walls are substantially orthogonal to said one main flat surface.

17. A vibration or shock absorbing member which comprises an integral structure, a plurality of protrusion formed at least on one main flat surface of said integral structure in a matrix pattern, partition walls intersecting each other on one level in the integral structure, and a plurality of independent hollow portions each having an area larger than that of each of said protrusions and formed under said protrusions within the integral structure through said intersecting partition walls in the matrix pattern.

18. A vibration or shock absorbing member according to claim 17, wherein each of said intersecting partition walls are substantially orthogonal to said one main flat surface.

* * * * *

UNITED STATES PATENT AND TRADEMARK OFFICE
CERTIFICATE OF CORRECTION

PATENT NO. : 5,334,434
DATED : August 2, 1994
INVENTOR(S) : Shiota et al.

It is certified that error appears in the above-identified patent and that said Letters Patent is hereby corrected as shown below:

In column 6, line 11, the word "intersections" should be --intersecting--.

In column 6, line 14, the word "of" should be --or--.

In column 6, line 25, the word "protrusion" should be --protrusions--.

In column 6, line 32, the word "intersections" should be --intersecting--.

In column 6, line 47, the word "protrusion" should be --protrusions--.

In column 7, line 6, delete the phrase "each of said second hollow portions.".

In column 7, line 16, the number "7" should be --10--.

UNITED STATES PATENT AND TRADEMARK OFFICE
CERTIFICATE OF CORRECTION

PATENT NO. : 5,334,434
DATED : August 2, 1994
INVENTOR(S) : Shiota, et al

It is certified that error appears in the above-indentified patent and that said Letters Patent is hereby corrected as shown below:

In column 8, line 21, the word "protrusion" should be --protrusions--.

Signed and Sealed this

Nineteenth Day of September, 199

Attest:

BRUCE LEHMAN

*Attesting Officer*  *Commissioner of Patents and Trademarks*